US010494860B1

(12) United States Patent
Jones et al.

(10) Patent No.: US 10,494,860 B1
(45) Date of Patent: Dec. 3, 2019

(54) GLAZINGS AND PROCESSES FOR PRODUCING GLAZINGS

(71) Applicants: Christopher D. Jones, Los Gatos, CA (US); Ibuki Kamei, Santa Clara, CA (US); Stephen B. Lynch, Sunnyvale, CA (US); Dale N. Memering, San Francisco, CA (US)

(72) Inventors: Christopher D. Jones, Los Gatos, CA (US); Ibuki Kamei, Santa Clara, CA (US); Stephen B. Lynch, Sunnyvale, CA (US); Dale N. Memering, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 242 days.

(21) Appl. No.: 15/655,236

(22) Filed: Jul. 20, 2017

Related U.S. Application Data (60) Provisional application No. 62/372,445, filed on Aug. 9, 2016.

(51) Int. Cl.
| | |
|---|---|
| *E06B 3/66* | (2006.01) |
| *E06B 3/673* | (2006.01) |
| *B60J 1/00* | (2006.01) |
| *E06B 3/663* | (2006.01) |
| *B60J 10/70* | (2016.01) |
| *B60J 10/21* | (2016.01) |
| *B29L 31/00* | (2006.01) |

(52) U.S. Cl.
CPC .......... *E06B 3/67308* (2013.01); *B60J 1/008* (2013.01); *B60J 10/21* (2016.02); *B60J 10/70* (2016.02); *E06B 3/66309* (2013.01); *B29L 2031/7782* (2013.01)

(58) Field of Classification Search
CPC ... B60J 1/001; B60J 1/008; B60J 10/21; B60J 10/70; E06B 3/66
See application file for complete search history.

(56) References Cited

U.S. PATENT DOCUMENTS

| | | | |
|---|---|---|---|
| 2,897,632 A | 8/1959 | Fowler et al. | |
| 4,865,919 A | 9/1989 | Frank et al. | |
| 5,009,463 A * | 4/1991 | Saitoh | B60J 1/008 296/193.06 |
| 6,793,277 B2 * | 9/2004 | Chon | B32B 17/10045 296/211 |
| 7,086,693 B1 * | 8/2006 | Huisman | B62D 25/06 296/146.1 |

(Continued)

FOREIGN PATENT DOCUMENTS

| | | |
|---|---|---|
| CA | 1286341 C | 7/1991 |
| DE | 4324847 A1 | 1/1995 |
| JP | 2012519620 A | 8/2012 |

*Primary Examiner* — Scott W Dodds
(74) *Attorney, Agent, or Firm* — Young Basile Hanlon & MacFarlane, P.C.

(57) ABSTRACT

A method includes forming a glass structure that has a peripheral edge, wherein an exterior surface of the glass structure includes a compound curvature. The method also includes fractionalizing the glass structure to define a primary portion and one or more panels, wherein the primary portion includes a front window area, a roof area, and a rear window area, and connecting the primary portion and the one or more panels to a body of a vehicle.

19 Claims, 4 Drawing Sheets

(56) References Cited

U.S. PATENT DOCUMENTS

| | | | |
|---|---|---|---|
| 2007/0182217 A1* | 8/2007 | Saleen | B62D 25/06 296/215 |
| 2008/0106124 A1* | 5/2008 | Snider | B60J 7/0015 296/215 |
| 2010/0084894 A1 | 4/2010 | Billy et al. | |
| 2015/0367782 A1* | 12/2015 | Mannheim Astete | B60J 3/04 349/12 |

* cited by examiner

GLAZINGS AND PROCESSES FOR PRODUCING GLAZINGS

CROSS-REFERENCE TO RELATED APPLICATIONS

This application claims the benefit of U.S. Provisional Application No. 62/372,445, filed on Aug. 9, 2016 and entitled "Glazings and Processes for Producing Glazings," which is incorporated herein by reference in its entirety.

TECHNICAL FIELD

The application relates generally to automotive glazings, methods for manufacturing automotive glazings, and automotive glazings produced by the methods.

BACKGROUND

Automobile windows allow vehicle occupants to view the environment outside the vehicle, and also admit light into the interior of the vehicle. In a typical manufacturing process for automobile windows, a flat glass panel is heated and shaped, such as by applying pressure to the glass panel. Individual windows are then installed in the vehicle, typically separated from one another by body panels or trim structures.

SUMMARY

One aspect of the disclosed embodiments is a method that includes forming a glass structure that has a peripheral edge, wherein an exterior surface of the glass structure includes a compound curvature. The method also includes fractionalizing the glass structure to define a primary portion and one or more panels, wherein the primary portion includes a front window area, a roof area, and a rear window area. The method also includes connecting the primary portion and the one or more panels to a body of a vehicle.

Another aspect of the disclosed embodiments is a vehicle having a vehicle body, a front window, a rear window, a roof, and one or more moveable windows that are mounted to the vehicle body. The vehicle is produced by a process that includes forming a one-piece glass structure having a convexly curved exterior shape that extends upward from an outer edge. The process also includes defining a primary portion and the one or more panels from the one-piece glass structure. The process also includes connecting the primary portion to a vehicle body, and connecting the one or more panels to the vehicle body.

Another aspect of the disclosed embodiments is a method that includes forming a glass structure that has a top area, a front area that extends from the top area to a front end of the glass structure, a rear area that extends from the top area to a rear end of the glass structure, a first side area that extends downward from the top area, and a second side area that extends downward from the top area. The method also includes dividing the glass structure to define a primary portion that includes the front end and the rear end of the glass structure, one or more first side panels that include at least part of the first side area of the glass structure, and one or more second side panels that include at least part of the second side area of the glass structure. The method also includes forming inner glass panels corresponding to the primary portion, the one or more first side panels, and the one or more second side panels. The method also includes, subsequent to dividing the glass structure, laminating the inner glass panels to respective ones of the primary portion, the one or more first side panels, and the one or more second side panels. The method also includes connecting the primary portion, the one or more first side panels, and the one or more second side panels to a body of a vehicle.

BRIEF DESCRIPTION OF THE DRAWINGS

The description herein will be made with reference to the following drawings.

DETAILED DESCRIPTION

Typical methods of forming a multi-part glass structure may lead to variations or distortions at the edges of the individual panels. If the panels are assembled with respect to one another such that edges of the individual glazings are adjacent to one another, the panels may not align properly and/or may not present consistent reflections due to the variations and/or distortions. The following disclosure relates to forming automotive glazings by first forming a glass structure such as a dome-shaped glass structure, and then fractionalizing the glass structure into individual glazings. The glazings are assembled with respect to the vehicle according to the relative positions that they were in prior to fractionalization. Since formation of the glass structure is a single process, variations and distortions may be avoided.

Figure 1:
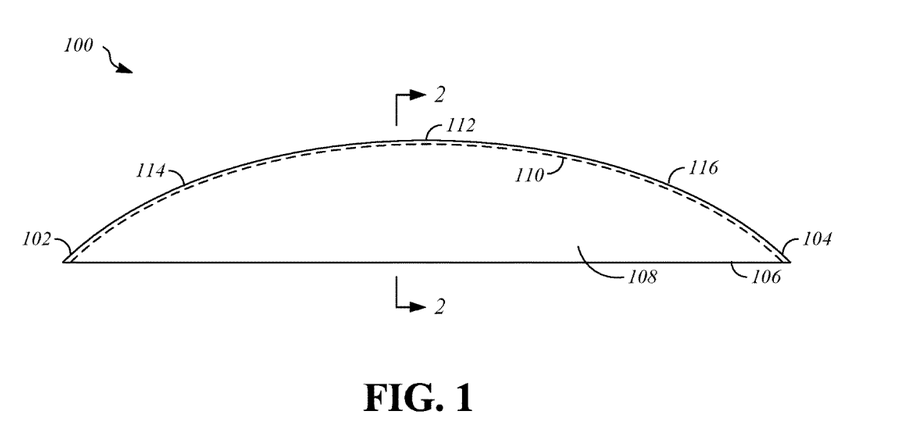
FIG. 1 is a side view of a glass structure.

FIG. 1 is a side view that shows a side profile of a glass structure 100. The glass structure 100 is an intermediate product formed during a process for forming automotive glazings, as will be described herein.

The glass structure 100 is a one-piece glass structure, and may be formed entirely from glass. The external shape of the glass structure 100 may be convex. In some implementations, the glass structure 100 has a dome-like shape that includes or is defined by simple curvatures and/or compound curvatures in the front-to-rear and side-to-side directions. A simple curvature can include circular or spiral arcs that are joined by tangent sections. A compound curvature is defined by two or more arcs of differing radii, which are joined tangentially without reversal. Glass structure 100 need not be dome-like and can include any structure that covers at least a portion of a vehicle, including structures that have conical, semispherical, planar or other shapes.

The external shape of the glass structure 100 may be defined in part by a curvature that extends between a front end 102, which may be referred to as the front of the glass structure 100, and a rear end 104, which may be referred to as the rear of the glass structure 100. The front end 102 and the rear end 104 may be spaced from one another in a longitudinal direction of the glass structure 100.

In some embodiments, the curvature between the front end 102 and the rear end 104 may be substantially continuous, without abrupt transitions. As examples, the front-to-rear curvature of the glass structure may be a curve of constant radius, a compound curve including segments of different radii that meet at tangents, or a curve of constantly changing radius (i.e., a spiral curve).

When assembled with respect to a vehicle, the glazings resulting from the glass structure 100 may be oriented such that the longitudinal direction of the glass structure 100 extends in the front-to-rear direction of the vehicle. Thus the front end 102 of the glass structure 100 may be installed adjacent to the front end of the vehicle, and the rear end 104 of the glass structure 100 may be installed adjacent to the rear end of the vehicle, with the front-to-rear direction of the vehicle being defined, for example, relative to an intended primary direction of travel for the vehicle.

The front end 102 and the rear end 104 may be located along portions of an outer edge or a peripheral edge 106 of the glass structure 100. The peripheral edge 106 of the glass structure 100 has a substantially closed shape. The closed shape of the peripheral edge 106 may be regular (e.g., circular, elliptical, or polygonal) or irregular.

In some embodiments, the glass structure 100 may have a generally constant thickness between an exterior surface 108 of the glass structure 100 and an interior surface 110 of the glass structure 100. As used herein, "generally constant thickness" indicates that the thickness of the glass structure deviates from a constant thickness as a result of inconsistencies introduced by manufacturing processes, and/or deviates from a constant thickness according to typical manufacturing tolerances.

In some embodiments, at least a portion of the exterior surface 108 of the glass structure 100 is convex, and at least a portion of an interior surface 110 of the glass structure 100 is concave. In some embodiments, all of the exterior surface 108 of the glass structure 100 is convex, and all of the interior surface 110 of the glass structure 100 is concave.

The glass structure 100 has a top area 112 located between the front end 102 and the rear end 104. The top area 112 is a portion of the glass structure 100 that is spaced from the peripheral edge. In some embodiments, the top area 112 is a portion of the glass structure 100 that is located furthest outward from the peripheral edge. Upon completion of the processes described herein, the top area 112 of the glass structure 100 may define a roof of the vehicle.

A front area 114 of the glass structure 100 is located between the top area 112 and the front end 102. Upon completion of the processes described herein, the front area 114 of the glass structure 100 may define a windshield of the vehicle. A rear area 116 of the glass structure 100 is located between the top area 112 and the rear end 104. Upon completion of the processes described herein, the rear area 116 of the glass structure 100 may define a rear window of the vehicle.

Figure 2:
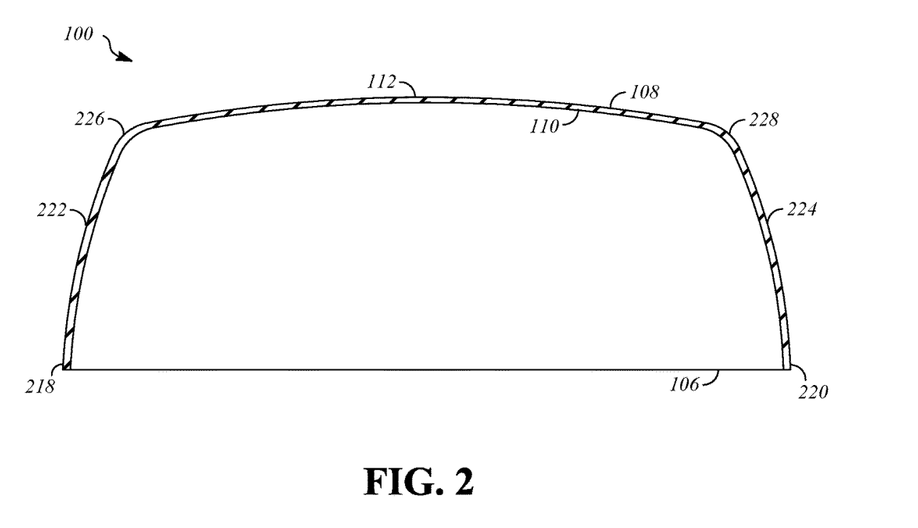
FIG. 2 is a cross-section view of the glass structure, taken along line 2-2 of FIG. 1.

FIG. 2 is a cross-section view of the glass structure 100 of FIG. 1, taken along line 2-2 of FIG. 1, looking toward the rear of the glass structure 100 in the front-to-rear direction. In the illustrated example, the glass structure 100 has a convex exterior shape in the side-to-side direction.

In the side-to-side direction, the glass structure 100 has a first side edge 218 and a second side edge 220, which may be portions of the peripheral edge 106. A first side area 222 is positioned between the first side edge 218 and the top area 112 such that the first side area 222 extends downward from the top area 112 to the first side edge 218. A second side area 224 may be positioned between the second side edge 220 and the top area 112 such that the second side area extends downward from the top area 112 to the second side edge 220.

In some embodiments, the glass structure 100 includes a first transition area 226 and a second transition area 228. The first transition area 226 and the second transition area 228 are portions of the glass structure 100 where the curvature increases and defines a visible boundary between adjacent areas. In the illustrated example, the first transition area 226 extends in a generally front-to-rear direction and defines a boundary between the first side area 222 and the top area 112, and the second transition area 228 extends in a generally front-to-rear direction and defines a boundary between the second side area 224 and the top area 112. The first transition area 226 is configured such that the top area 112 is located on a first side of the first transition area 226, and the first side area 222 is located on a second side of the first transition area 226. The second transition area 228 is configured such that the top area 112 is located on a first side of the second transition area 228, and the second side area 224 is located on a second side of the second transition area 228.

Figure 3:
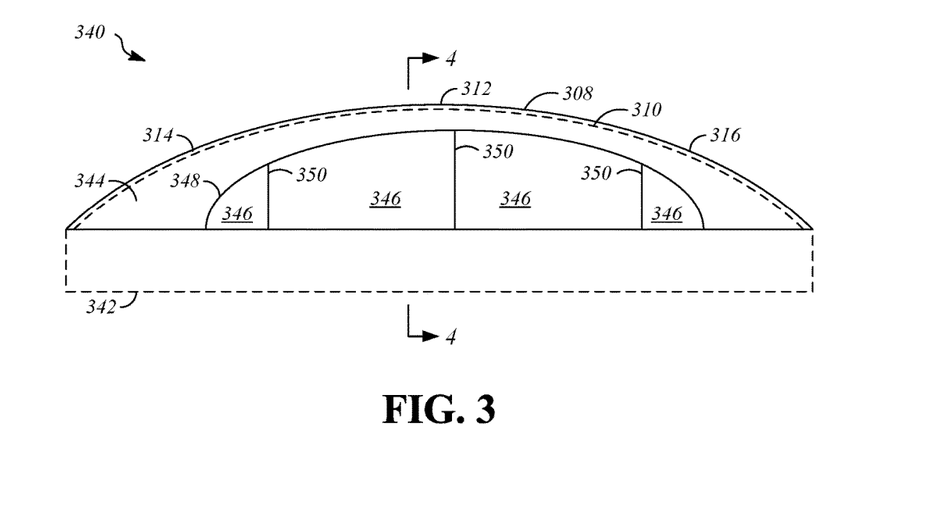
FIG. 3 is a side view of a vehicle.

FIG. 3 is a side view that shows a vehicle 340. The vehicle 340 includes a body 342, which may include any or all of exterior panels, interior panels, a frame, a subframe, a unibody, or a monocoque. The vehicle 340 includes glazings that are formed from the glass structure 100 of FIG. 1, such as by fractionalizing the glass structure 100. As used herein, "fractionalizing" refers to dividing a single glass panel into multiple parts by any process, such as by cutting or breaking.

The glazings include a primary portion 344 and one or more panels 346 that have an exterior surface 308 and an interior surface 310. The primary portion 344 is mounted to the body 342. In some embodiments, the primary portion 344 is rigidly and immovably attached to the body 342 using structures such as fasteners and/or adhesives.

The primary portion 344 of the glazings includes a roof area 312 that corresponds to the top area 112 of the glass structure 100 of FIG. 1. The primary portion 344 also includes a front window area 314 (i.e., a windshield area) that corresponds to the front area 114 of the glass structure 100 of FIG. 1, and a rear window area 316 that corresponds to the rear area 116 of the glass structure 100 of FIG. 1.

The panels 346 may be, for example, windows. In the illustrated example in FIG. 3, the panels 346 are configured as side windows for the vehicle 340, and may be movably mounted to the vehicle 340, such as by conventional window mounting structures that allow lowering of windows into portions of the body 342, such as doors that are included as part of the body 342. The panels 346 may be separated from the primary portion 344 by a primary gap 348, and the panels 346 may be separated from one another by secondary gaps 350. The sizes of the primary gap 348 and the secondary gaps 350 may correspond to the kerf width of a tool or process used to fractionalize the glass structure 100 of FIG. 1, as will be described herein.

In some embodiments, the glazings include panels other than windows. As one example, the glazings may include a sunroof panel. As another example, the glazings may include a rear door (e.g., a tailgate or a liftgate) panel.

Figure 4:
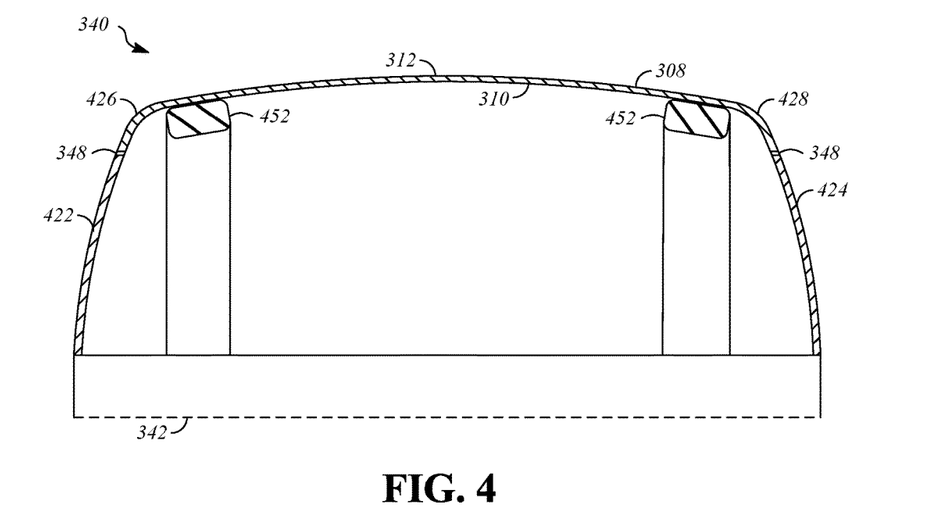
FIG. 4 is a cross-section view of the vehicle taken along line 4-4 of FIG. 3.

FIG. 4 is a cross-section view of the vehicle 340 taken along line 4-4 of FIG. 3, looking toward the rear of the vehicle 340 in the front-to-rear direction, and shows a side-to-side profile of the primary portion 344 and the panels 346.

The primary portion 344 may include a first side area 422, a second side area 424, a first transition area 426, and a second transition area 428. The first transition area 426 separates the first side area 422 from the roof area 312, and the second transition area 428 separates the second side area 424 from the roof area 312. In the illustrated example, the panels 346 are disposed adjacent to the first side area 422 and the second side area 424 of the primary portion 344.

The primary portion 344 may be supported by internal structures 452 that are connected to or form a part of the body 342, and engage or are otherwise connected to the interior surface 310 of the primary portion 344. In the illustrated example, the internal structures are beams, such as cant rails, that extend in the longitudinal direction of the vehicle 340 and support the roof area 312 of the primary portion 344. The internal structures 452 may be positioned, in some embodiments, along or adjacent to the first transition area 426 and the second transition area 428.

Figure 5:
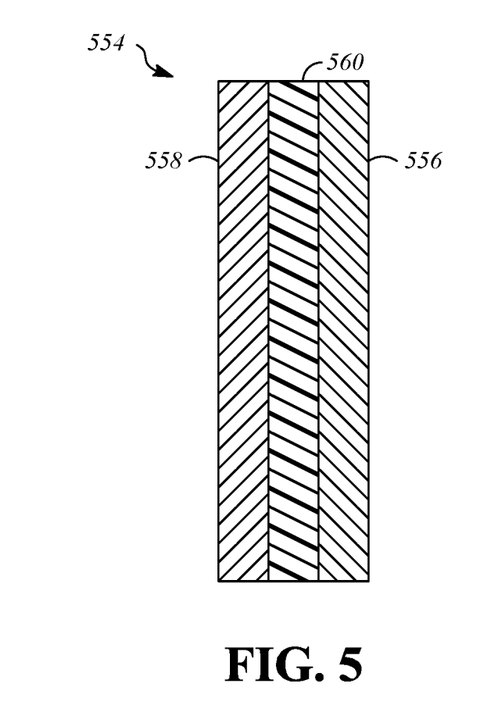
FIG. 5 is a cross-section view of a glass panel.

FIG. 5 is a cross-section view that shows a glazing portion 554. The glazing portion 554 is representative of a laminated cross-sectional structure that may be utilized for the primary portion 344 and the panels 346 of FIG. 3.

The glazing portion 554 includes an outer layer 556, an inner layer 558, and an interlayer 560 that is located between the outer layer 556 and the inner layer 558. The outer layer 556 may define an exterior surface for the glazing portion 554, facing away from the interlayer 560. The inner layer 558 may define an interior surface of the glazing portion 554, facing away from the interlayer 560.

The outer layer 556 and the inner layer 558 may both be formed from glass, as will be described herein, and the interlayer 560 may be any material suitable for laminating layers of glass together. As an example, the interlayer 560 may be formed from transparent polyvinyl butyral (PVB). As will be described, the outer layer 556 may be formed from the glass structure 100 of FIG. 1. In some embodiments, the inner layer 558 is formed from a second glass structure that is similar to the glass structure 100 of FIG. 1. In other embodiments, the inner layer 558 is formed by a different process, and may be defined by multiple panels that are formed separately.

Figure 6:
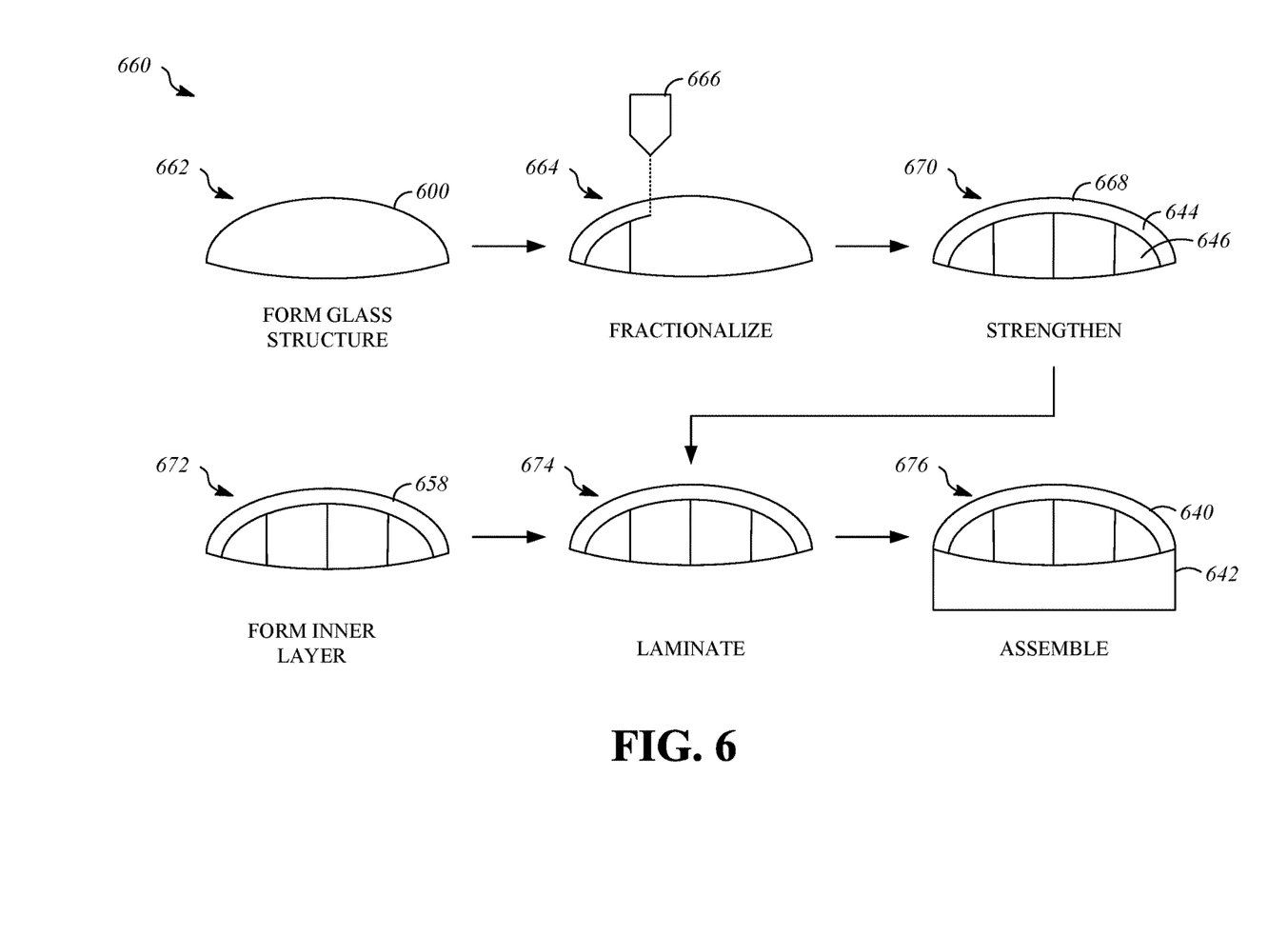
FIG. 6 is an illustration showing a process.

FIG. 6 shows a process 660 for producing the glazings such as a primary portion 644 and panels 646, and for producing a vehicle 640 that includes the glazings.

Operation 662 includes forming a glass structure 600. Forming the glass structure 600 includes making a glass structure that is shaped according to a predetermined contour. The glass structure 600 may be formed to have geometrical features similar to those described with respect to the glass structure 100 of FIG. 1. In some embodiments, operation 662 includes forming a one-piece glass structure having a convexly curved exterior shape that extends upward from an outer edge to a top area, and the outer edge may be a peripheral edge that has a closed shape.

The glass structure 600 may be formed by any process suitable for the geometry of the glass structure 600. Suitable processes for forming the glass structure 600 may include press molding, blow forming, mold forming, sheet forming, glass casting, vapor growth, 3D printing, and injection molding.

Operation 664 includes fractionalizing the glass structure 600 to define a primary portion and one or more panels. Fractionalizing the glass structure 600 may be performed using a tool 666. As examples, the tool 666 may be an abrasive water jet cutter, a laser, a diamond wire cutter, a thin flexible blade, or a score-and-break cutting operation. Operation 664 results in a fractionalized glass structure 668 that includes portions that correspond to and will be used to form the primary portion 644 and panels 646 of the vehicle 640. The positions that the panels 646 are located in relative to the primary portion 644 prior to fractionalization may be referred to as original positions or pre-fractionalization positions.

The fractionalized glass structure 668 is strengthened in operation 670. Operation 670 may include strengthening at least part of the primary portion 644 or the panels 646 of the fractionalized glass structure 668 prior to laminating. Strengthening the fractionalized glass structure 668, such as the parts corresponding to the primary portion 644 and the panels 646 of the glazings of the vehicle 640, is optional and may be omitted some applications. Conventional methods (e.g., tempering) may be used to strengthen the fractionalized glass structure 668.

Operation 672 includes forming an inner glass layer 658 that will subsequently be laminated to the glazings of the fractionalized glass structure 668 and will define an interior of the primary portion 644. Operation 672 may include separately forming glass panels for the inner glass layer 658 with each of the glass panels corresponding to a portion of the fractionalized glass structure 668. The inner glass layer 658, when laminated to the fractionalized glass structure 668, will be the interior of the laminated structure, and when incorporated in the vehicle will be positioned adjacent to the interior of the vehicle. The inner glass layer 658 is shaped according to the predetermined contour as described with respect to forming the glass structure 600 in operation 662.

In some embodiments, operation 672 includes forming and fractionalizing a second glass structure in the manner described with respect to operations 662 and 664.

Operation 674 includes laminating the fractionalized glass structure 668 to the inner glass layer 658. Operation 674 results in glazings, such as the primary portion 644 and the panels 646.

In operation 676, the glazings, including the primary portion 644 and the panels 646, are assembled to the body 642. Assembling the primary portion 644 and one or more panels 646 to the body 642 of the vehicle 640 includes positioning the panels 646 relative to the primary portion 644 of the fractionalized glass structure 668 according to their respective pre-fractionalization positions and connecting the primary portion 644 and one or more panels 646 to the body 642. Operation 676 results in the vehicle 640. As a result of the positioning included in operation 676, the one or more panels 646 are positioned relative to the primary portion 644 according to their respective pre-fractionalization positions subsequent to connecting the primary portion 644 and the one or more panels 646 to the body 642 of the vehicle 640.

As an example, the primary portion 644 may be fixed to the body 642 in operation 676 by conventional methods such as by adhesives or fasteners, and the panels 646 may be secured to the body 642 using hardware that allows them to move relative to the primary portion 644, such as by raising and lowering. When the panels 646 are moveable with respect to the primary portion 644, the panels 646 may move between positions that include their respective pre-fractionalization positions.

As a result of the process 660, variations and distortions may be avoided between the glazings of the vehicle 640. Thus, the glazings of the vehicle 640 may be assembled in a close relationship with respect to one another and, in some embodiments, without intervening trim elements or body structures.

What is claimed is:

1. A method, comprising:

forming a glass structure that has a peripheral edge, wherein an exterior surface of the glass structure includes a compound curvature;

fractionalizing the glass structure to define a primary portion, first side panels, and second side panels, wherein the primary portion includes a front window area, a roof area, and a rear window area; and connecting the primary portion, the first side panels, and the second side panels to a body of a vehicle such that the front window area of the primary portion defines a windshield of the vehicle, the roof area of the primary portion defines a roof of the vehicle, the rear window area of the primary portion defines a rear window of the vehicle, the first side panels define first side windows of the vehicle, and the second side panels define second side windows of the vehicle.

2. The method of claim 1, wherein the glass structure includes a top area, a front area that extends from the top area to the peripheral edge, a rear area that extends from the top area to the peripheral edge, a first side area that extends from the top area to the peripheral edge, and a second side area that extends from the top area to the peripheral edge wherein the front area, the rear area, the first side area, and the second side area all extend upward from the peripheral edge.

3. The method of claim 2, wherein a first transition area of the glass structure extends in a front-to-rear direction, a second transition area of the glass structure extends in the front-to-rear direction, and the top area is located between the first transition area and the second transition area.

4. The method of claim 1, wherein fractionalizing the glass structure includes removing the first side panels and the second side panels from respective pre-fractionalization positions relative to the primary portion, and the first side panels and the second side panels are positioned relative to the primary portion according to their respective pre-fractionalization positions subsequent to connecting the primary portion the first side panels and the second side panels to the body of the vehicle.

5. The method of claim 1, further comprising:
forming an inner glass layer; and
laminating the inner glass layer to the primary portion, the first side panels, and the second side panels subsequent to fractionalizing the glass structure.

6. The method of claim 5, wherein forming the inner glass layer comprises:
forming a second glass structure; and
fractionalizing the second glass structure.

7. The method of claim 5, wherein forming the inner glass layer comprises:
separately forming glass panels for the inner glass layer.

8. A method, comprising:
forming a glass structure that has a top area, a front area that extends from the top area to a front end of the glass structure, a rear area that extends from the top area to a rear end of the glass structure, a first side area that extends downward from the top area, a second side area that extends downward from the top area, a first transition area that extends in a front-to-rear direction between the top area and the first side area and is defined by increased curvature relative to the top area and the first side area, and a second transition area that extends in the front-to-rear direction between the top area and the second side area and is defined by increased curvature relative to the top area and the second side area;
dividing the glass structure to define a primary portion that includes the front end and the rear end of the glass structure, first side panels that include at least part of the first side area of the glass structure, and second side panels that include at least part of the second side area of the glass structure;
forming inner glass panels corresponding to the primary portion, the first side panels, and the second side panels;

subsequent to dividing the glass structure, laminating the inner glass panels to respective ones of the primary portion, the first side panels, and the second side panels; and
connecting the primary portion, the first side panels, and the second side panels to a body of a vehicle such that the front area of the primary portion defines a windshield of the vehicle, the top area of the primary portion defines a roof of the vehicle, the rear area of the primary portion defines a rear window of the vehicle, the first side panels define first side windows of the vehicle, and the second side panels define second side windows of the vehicle.

9. The method of claim 8, wherein the glass structure has a convex exterior.

10. The method of claim 8, wherein the glass structure has a front end, a rear end, and a curved side profile that extends from the front end to the rear end.

11. The method of claim 8, wherein the primary portion, when connected to the body of the vehicle, defines a front window area, a roof area, and a rear window area of the vehicle.

12. The method of claim 8, further comprising:
strengthening at least one of the primary portion, the first side panels, or the second side panels prior to laminating the inner glass panels to respective ones of the primary portion, the first side panels, and the second side panels.

13. A method, comprising:
forming a one-piece glass structure having a convexly curved exterior shape that extends upward from an outer edge;
defining a primary portion and panels from the one-piece glass structure by cutting the primary portion and panels from the one-piece glass structure;
connecting the primary portion to a vehicle body of a vehicle such that the primary portion defines a front window, a rear window, and a roof of the vehicle;
and connecting the panels to the vehicle body to define at least one side window of the vehicle.

14. The method of claim 13, wherein defining the primary portion and the panels from the one-piece glass structure further comprises removing the panels from their respective original positions relative to the primary portion, and connecting the primary portion and the panels to the vehicle body includes positioning the panels relative to the primary portion of the one-piece glass structure according to their respective original positions.

15. The method of claim 13, wherein the panels define the moveable windows of the vehicle.

16. The method of claim 13, wherein a first transition area of the one-piece glass structure extends in a front-to-rear direction, a second transition area of the one-piece glass structure extends in the front-to-rear direction, and a top area of the one-piece glass structure is located between the first transition area and the second transition area.

17. The method of claim 13, wherein the one-piece glass structure has a front end, a rear end, and a curved side profile that extends from the front end to the rear end.

18. The method of claim 13, the process further comprising:
forming an inner glass layer; and
laminating the inner glass layer to the primary portion and the panels subsequent to defining the primary portion and the panels from the one-piece glass structure.

19. The method of claim 13, wherein the panels include first side panels and second side panels, the first side panels define first side windows of the vehicle, and the second side panels define second side windows of the vehicle.

\* \* \* \* \*

UNITED STATES PATENT AND TRADEMARK OFFICE
CERTIFICATE OF CORRECTION

PATENT NO. : 10,494,860 B1  
APPLICATION NO. : 15/655236  
DATED : December 3, 2019  
INVENTOR(S) : Christopher D. Jones et al.

Page 1 of 1

It is certified that error appears in the above-identified patent and that said Letters Patent is hereby corrected as shown below:

In the Claims

At Column 7, Claim number 4, Line number 29:
"portion the first side panels and the second side panels" should be
--portion, the first side panels, and the second side panels--.

Signed and Sealed this
Seventh Day of January, 2020

Andrei Iancu
*Director of the United States Patent and Trademark Office*